(12) United States Patent
Warren et al.

(10) Patent No.: US 12,704,687 B2
(45) Date of Patent: Aug. 11, 2026

(54) INDEXED OPTICAL COUPLER FOR COUPLING OPTICAL FIBERS

(71) Applicant: Raytheon Technologies Corporation, Farmington, CT (US)

(72) Inventors: Eli Warren, Wethersfield, CT (US); Sebastian Martinez, Ivoryton, CT (US)

(73) Assignee: RTX CORPORATION, Farmington, CT (US)

( * ) Notice: Subject to any disclaimer, the term of this patent is extended or adjusted under 35 U.S.C. 154(b) by 524 days.

(21) Appl. No.: 18/104,686

(22) Filed: Feb. 1, 2023

(65) Prior Publication Data

US 2024/0255712 A1 Aug. 1, 2024

(51) Int. Cl.
*G02B 6/38* (2006.01)

(52) U.S. Cl.
CPC ......... *G02B 6/3894* (2013.01); *G02B 6/3825* (2013.01)

(58) Field of Classification Search
CPC ........................................................ G02B 6/38
USPC ........................................................... 385/77
See application file for complete search history.

(56) References Cited

U.S. PATENT DOCUMENTS 3,914,015 A 10/1975 Mc Cartney
4,009,931 A * 3/1977 Malsby .................. G02B 6/403 385/75
7,517,157 B1 4/2009 McNiece
7,785,016 B2 * 8/2010 Luther ................. G02B 6/3885 385/71
RE42,522 E * 7/2011 Zimmel ............... G02B 6/3825 439/587
8,280,205 B2 * 10/2012 Erdman ............... G02B 6/3853 385/74
9,028,154 B2 * 5/2015 Hui .......................... G02B 6/36 385/134
9,513,451 B2 * 12/2016 Corbille ............. G02B 6/44526
9,594,219 B2 * 3/2017 Lu ........................ G02B 6/3825
9,606,300 B2 * 3/2017 Sasaki .................. G02B 6/3882
10,545,299 B2 * 1/2020 Takeuchi ........... H01R 13/6683
10,768,059 B2 9/2020 Warren
10,794,795 B2 10/2020 Warren
10,852,487 B1 * 12/2020 Ignatius ............... G02B 6/3879
11,209,599 B2 * 12/2021 Takano .................. G02B 6/406
11,874,505 B2 * 1/2024 Hu ....................... G02B 6/3883
11,934,015 B2 * 3/2024 Lee ...................... G02B 6/3895
2016/0004016 A1 * 1/2016 Zimmel ............... G02B 6/3825 385/59
2017/0227719 A1 * 8/2017 Zimmel ............... G02B 6/3879
(Continued)

FOREIGN PATENT DOCUMENTS

CN 112129400 B 3/2023

OTHER PUBLICATIONS

EP Search Report for EP Patent Application No. 24155343.7 dated Jul. 2, 2024.

*Primary Examiner* — Kaveh C Kianni
(74) *Attorney, Agent, or Firm* — Getz Balich LLC

(57) ABSTRACT

An optical system is provided that includes a first optics line, a second optics line and an optical coupler removably connecting the first optics line to the second optics line. The first optics line includes a plurality of first optical fibers. The second optics line includes a plurality of second optical fibers. The optical coupler aligns an end of each of the first optical fibers with an end of a respective one of the second optical fibers to optically couple each of the first optical fibers to the respective one of the second optical fibers.

15 Claims, 12 Drawing Sheets

(56) References Cited

U.S. PATENT DOCUMENTS

| | | | | |
|---|---|---|---|---|
| 2017/0293091 | A1* | 10/2017 | Lu | G02B 6/3821 |
| 2019/0011648 | A1* | 1/2019 | Halderman | G02B 6/403 |
| 2019/0170961 | A1* | 6/2019 | Coenegracht | G02B 6/4444 |
| 2019/0302374 | A1* | 10/2019 | Lee | H01R 13/426 |
| 2019/0346634 | A1* | 11/2019 | Takano | G02B 6/3891 |
| 2020/0012050 | A1* | 1/2020 | Takano | G02B 6/3879 |
| 2020/0319420 | A1* | 10/2020 | Cams | G02B 6/4454 |
| 2020/0341215 | A1* | 10/2020 | Ignatius | G02B 6/387 |
| 2021/0145260 | A1* | 5/2021 | Boelen | A61B 1/00188 |
| 2021/0255402 | A1 | 8/2021 | Sutherland | |
| 2022/0043219 | A1* | 2/2022 | Mach | G02B 6/4292 |
| 2023/0071759 | A1* | 3/2023 | Erreygers | H04B 10/27 |
| 2023/0204868 | A1* | 6/2023 | Baca | G02B 6/3897<br>385/60 |

* cited by examiner 42
72
82
30A,30B
78
76
80
68

78

74
70

22A
68
82
78
72
78
82
60
42
74
54
60
38A
70
76
40

22A
68
78
72
78
82
54
42
74
54
60
38A
76
70

42
22A
74
44
46
38A
40
38B
22B 22A
68
76
42
54
38A
60
70
40
38B
54
60
22B

INDEXED OPTICAL COUPLER FOR COUPLING OPTICAL FIBERS

BACKGROUND OF THE DISCLOSURE

1. Technical Field

This disclosure relates generally to optics and, more particularly, to an optical coupler for coupling optical fibers.

2. Background Information

Optical fibers may be used for various applications including transmitting light signals for an optical probe. Optical fibers may be optically coupled together by an optical coupler. Various types and configurations of optical couplers are known in the art. While these known optical couplers have various benefits, there is still room in the art for improvement. There is a need in the art, for example, for an optical coupler which can provide improve light transmission between optical fibers.

SUMMARY OF THE DISCLOSURE

According to an aspect of the present disclosure, an optical system is provided that includes a first optics line, a second optics line and an optical coupler removably connecting the first optics line to the second optics line. The first optics line includes a plurality of first optical fibers. The second optics line includes a plurality of second optical fibers. The optical coupler aligns an end of each of the first optical fibers with an end of a respective one of the second optical fibers to optically couple each of the first optical fibers to the respective one of the second optical fibers.

According to another aspect of the present disclosure, another optical system is provided that includes a first optics line, a second optics line and an optical coupler. The first optics line includes a plurality of first optical fibers. The second optics line includes a plurality of second optical fibers. The optical coupler longitudinally connects and optically couples the first optical fibers to the second optical fibers. The optical coupler includes a first connector, a second connector and a key. The first connector is mounted to an end of the first optics line. The first connector includes a first groove. The second connector is mounted to an end of the second optics line. The second connector includes a second groove. The key extends longitudinally within the first groove and the second groove.

According to still another aspect of the present disclosure, another optical system is provided that includes a first optics line, a second optics line and an optical coupler removably connecting the first optics line to the second optics line. The first optics line includes a plurality of first optical fibers. The second optics line includes a plurality of second optical fibers. The optical coupler arranges the first optical fibers relative to the second optical fibers to facilitate more than seventy percent light transmission between each of the first optical fibers and a respective one of the second optical fibers.

A first of the first optical fibers may be coaxial with a first of the second optical fibers within the optical coupler. A second of the first optical fibers may be coaxial with a second of the second optical fibers within the optical coupler.

The optical coupler may also include a bolt and a nut threaded onto the bolt. The first optics line may be optically coupled with the second optics line within the bolt. The bolt may include a bolt groove. The key may also extend longitudinally within the bolt groove.

Each of the first optical fibers may be coaxial with the respective one of the second optical fibers.

The end of each of the first optical fibers may laterally overlap at least ninety percent of the end of the respective one of the second optical fibers.

The first optical fibers may include a central first optical fiber and a plurality of peripheral first optical fibers arranged circumferentially about the central first optical fiber.

The optical coupler may include a bolt and a nut threaded onto the bolt. The first optics line may project into the bolt. The second optics line may project into the nut.

The first optical fibers may be optically coupled to the second optical fibers at an interface within the bolt.

The optical coupler may include a first connector and a second connector abutted longitudinally against the first connector. The first optical fibers may project longitudinally through a bore of the first connector to an end face of the first connector. The first optical fibers may be bonded to the first connector. The second optical fibers may project longitudinally through a bore of the second connector to an end face of the second connector. The second optical fibers may be bonded to the second connector.

The first connector and the second connector may be rotationally fixed within the optical coupler.

The first connector and the second connector may be indexed to facilitate the aligning of the end of each of the first optical fibers with the end of the respective one of the second optical fibers.

The first connector may include a first connector groove. The second connector may include a second connector groove. The optical coupler may also include a key arranged in the first connector groove and the second connector groove.

The optical coupler may also include a bolt and a nut threaded onto the bolt. The first optics line may project into the bolt. The second optics line may project through an endwall of the nut and into the bolt. The bolt may include a bolt groove. The key may also be arranged in the bolt groove.

The first optics line may also include a first optical sheath connected to the first connector. The first optical fibers may project out from the first optical sheath into the bore of the first connector. The second optics line may also include a second optical sheath connected to the second connector. The second optical fibers may project out from the second optical sheath into the bore of the second connector.

The optical coupler may include a key configured to clock the first optics line and the second optics line about a longitudinal centerline such that the end of each of the first optical fibers is aligned with the end of the respective one of the second optical fibers.

The optical system may also include an optical probe comprising the first optics line or the second optics line.

The optical system may also include a light source optically coupled to the first optics line or the second optics line.

The optical system may also include a light sensor optically coupled to the first optics line or the second optics line.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
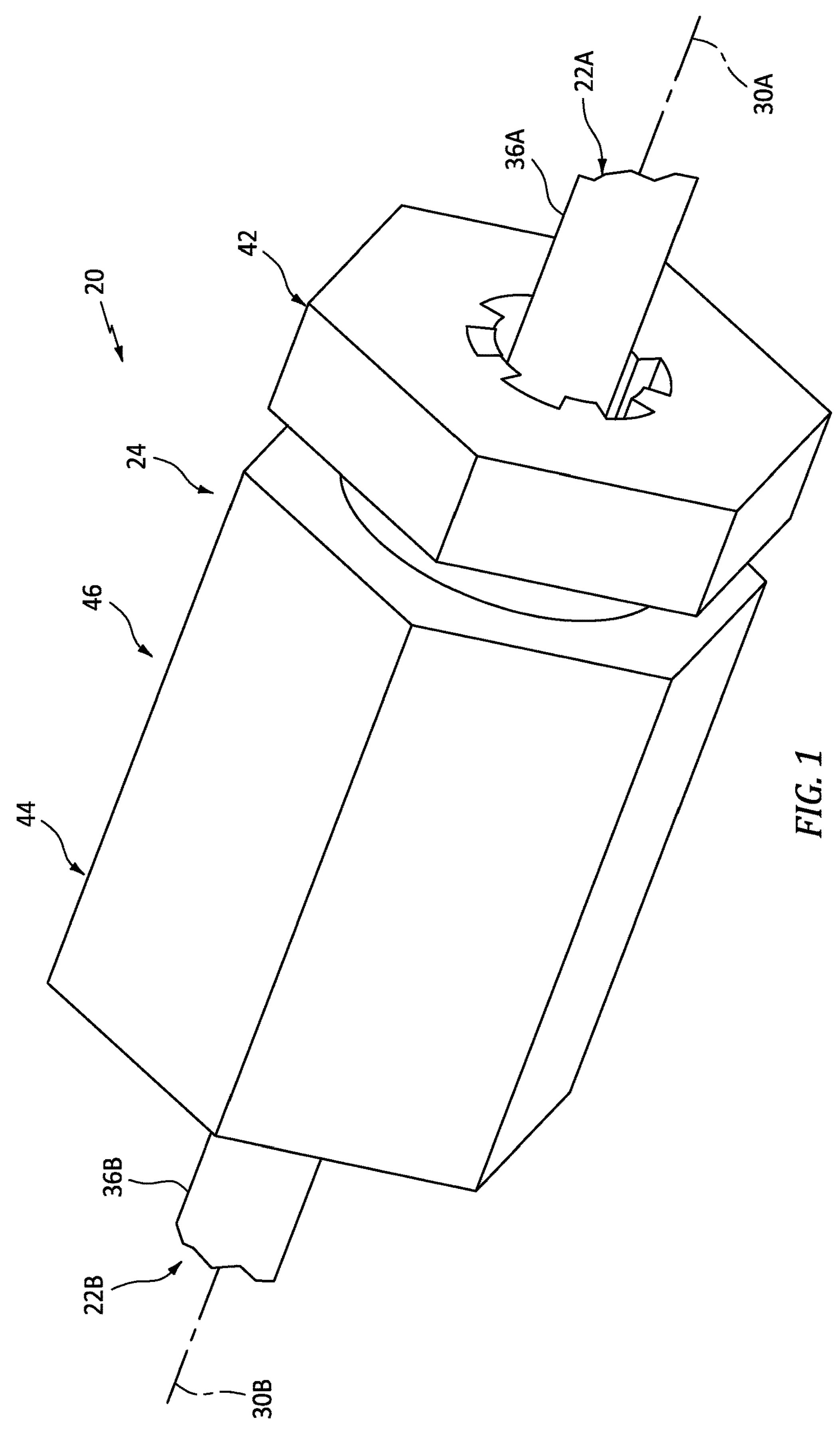
FIG. 1 is a partial perspective illustration of an optical system.
Figure 2:
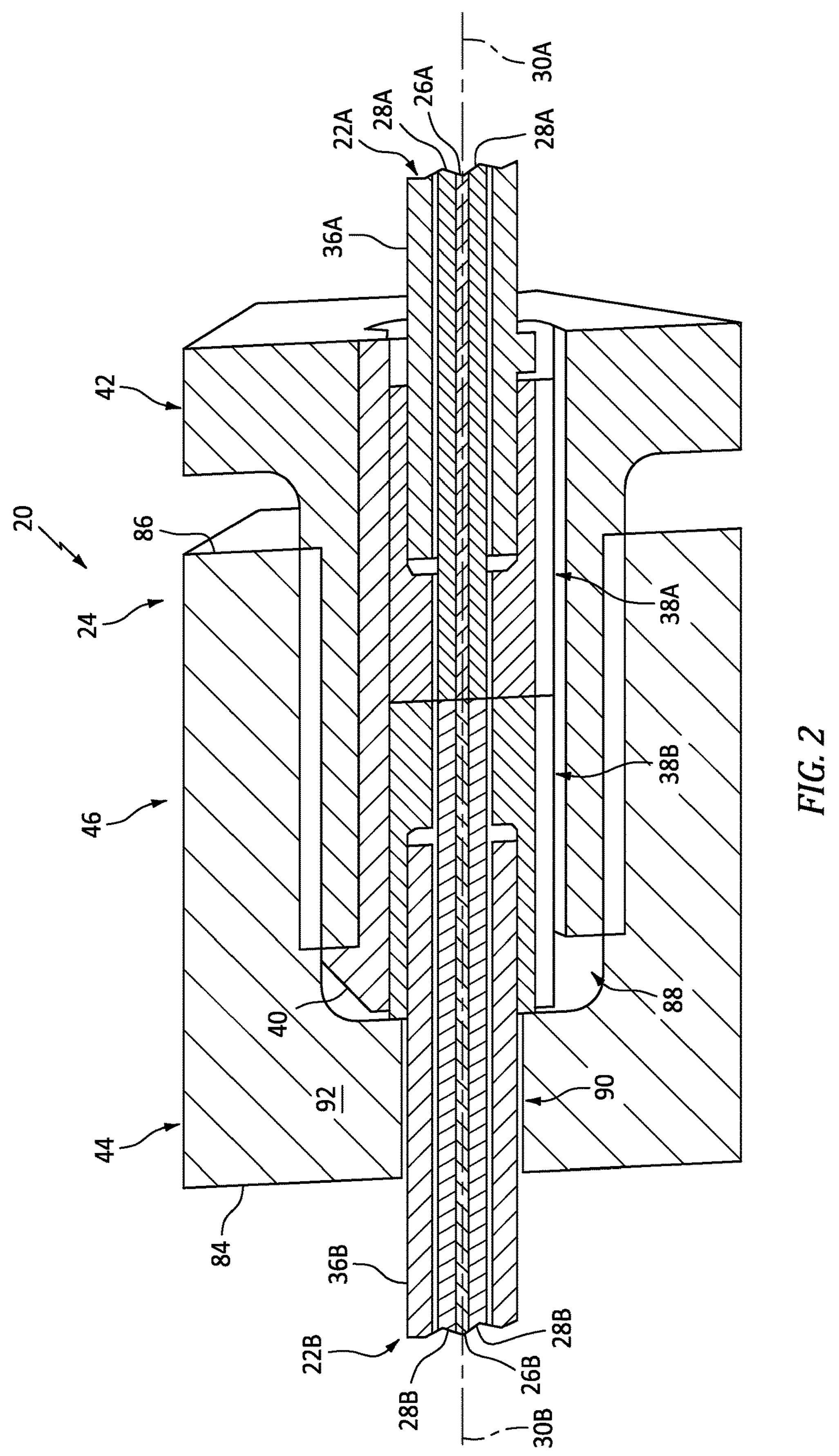
FIG. 2 is a partial perspective cutaway illustration of the optical system.

FIGS. 1 and 2 illustrate a portion of an optical system 20. This optical system 20 includes a first optics line 22A, a second optics line 22B and an indexed optical coupler 24 configured to removably (e.g., severably) connect the first optics line 22A to the second optics line 22B.

Figures 3, 4:
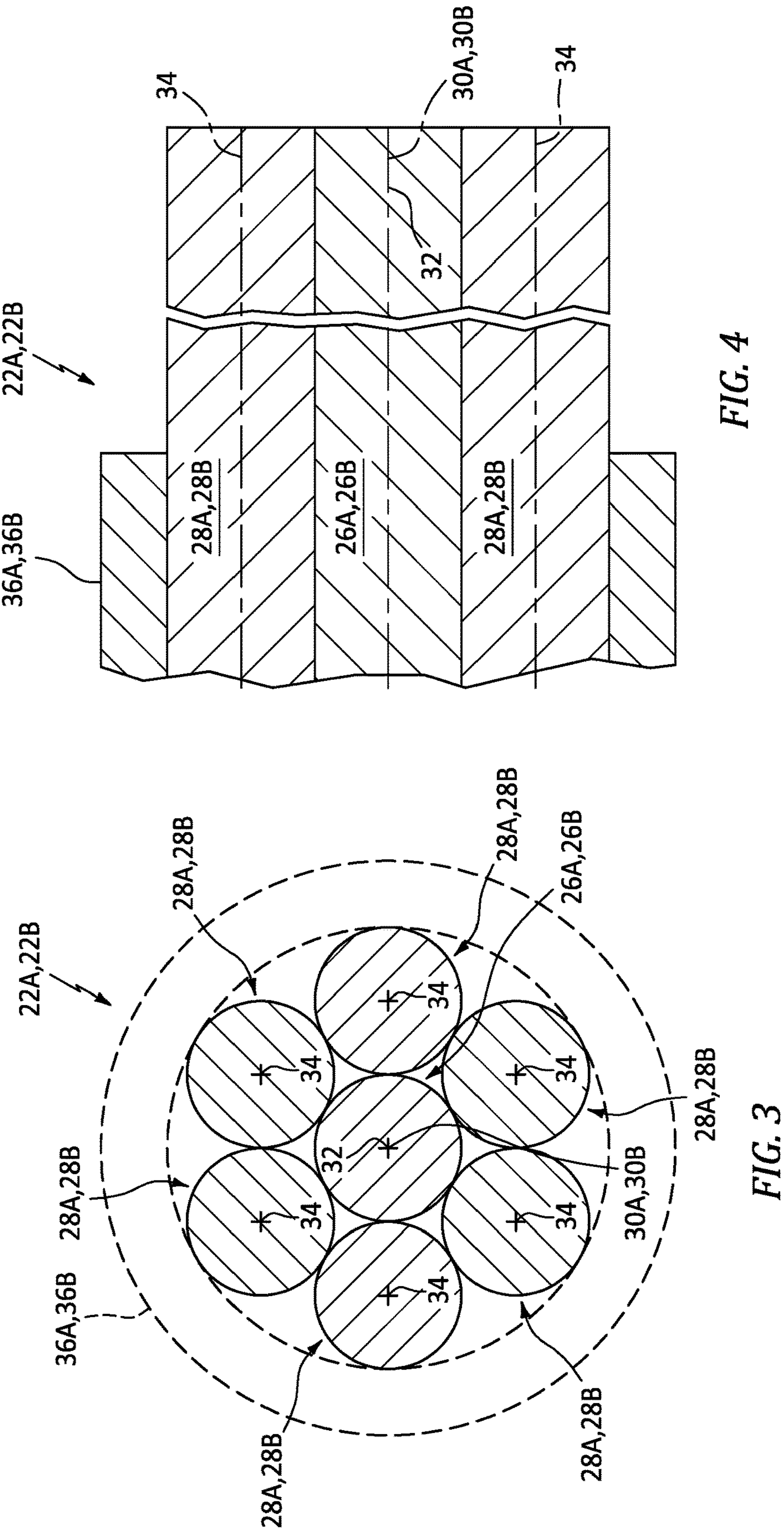
FIG. 3 is a cross-sectional illustration of an optics line with an optical sheath shown by dashed lines.
FIG. 4 is a partial sectional illustration of the optics line.

Each of the optics lines 22A, 22B (generally referred to as "22") is a longitudinally extending line (e.g., cable, conduit, etc.) of optical members. Each of the optics lines 22A, 22B of FIG. 2, for example, includes a bundle (e.g., a grouping) of multiple optical fibers 26A and 28A, 26B and 28B. Referring to FIG. 3, one of the optical fibers 26A, 26B (generally referred to as "26") may be centrally located within the bundle and referred to as a central optical fiber. The remaining optical fibers 28A, 28B (generally referred to as "28") may be located about a periphery of the central optical fiber 26A, 26B and referred to as peripheral optical fibers. Referring to FIG. 4, each optics line 22A, 22B extends longitudinally along a longitudinal centerline 30A, 30B of the respective optics line 22A, 22B. Within the optics line 22, each of the optical fibers 26, 28 extends longitudinally along a longitudinal centerline 32, 34 of the respective optical fiber 26, 28. The longitudinal centerline 32 of the central optical fiber 26 may be coaxial with the longitudinal centerline 30 of the respective optics line 22. The peripheral optical fibers 28 of FIGS. 3 and 4 extend longitudinally along and are distributed circumferentially about the central optical fiber 26 in a circular array. The longitudinal centerlines 34 of the peripheral optical fibers 28 may be parallel with (but, radially spaced out from) the longitudinal centerline 30, 32. Within the bundle of FIG. 3, the central optical fiber 26 may radially engage (e.g., contact) and/or be positioned radially adjacent each of the peripheral optical fibers 28. Each of the peripheral optical fibers 28 may be disposed circumferentially between and may circumferentially engage a set of circumferentially neighboring (e.g., adjacent) peripheral optical fibers 28. The present disclosure, however, is not limited to the foregoing exemplary arrangement of the optical fibers 26 and 28 within the bundle/the optics line 22. For example, in other embodiments, the respective optics line 22 may include multiple central optical fibers 26 surrounded by the peripheral optical fibers 28.

Each of the optics lines 22A, 22B may also include an optical sheath 36A, 36B (generally referred to as "36") such as, but not limited to, hypo-tubing, insulative tubing, non-transparent tubing and the like. Referring to FIG. 2, the optical sheath 36 extends longitudinally along at least a portion of the respective optics line 22 external to the optical coupler 24. The optical sheath 36 may also extend longitudinally along a portion of the respective optics line 22 internal to the optical coupler 24. An end portion of the respective optics line 22 and its optical fibers 26 and 28 within the optical coupler 24, however, may be uncovered by the optical sheath 36. The end portion of the optics line 22 and its optical fibers 26 and 28 of FIG. 4, for example, project longitudinally out from the optical sheath 36 to a distal end of the respective optics line 22/distal ends of the respective optical fibers 26 and 28. The optical sheath 36 of FIG. 3 (see dashed line) extends circumferentially about (e.g., completely around) the bundle of the optical fibers 26 and 28. The optical sheath 36 may thereby circumscribe and completely house, shield, protect and/or otherwise cover a select longitudinal length of the bundle of the optical fibers 26 and 28.

Referring to FIG. 2, the optical coupler 24 includes a plurality of line connectors 38A and 38B (generally referred to as "38") (e.g., line end fittings) respectively arranged with the optics lines 22A, 22B. The optical coupler 24 of FIG. 2 also includes a coupler key 40, a coupler bolt 42 and a coupler nut 44, where the coupler bolt 42 and the coupler nut 44 form a housing structure 46 for an optical interface between (a) the first optics line 22A and its first optical fibers 26A and 28A and (b) the second optics line 22B and its second optical fibers 26B and 28B.

Figure 5:
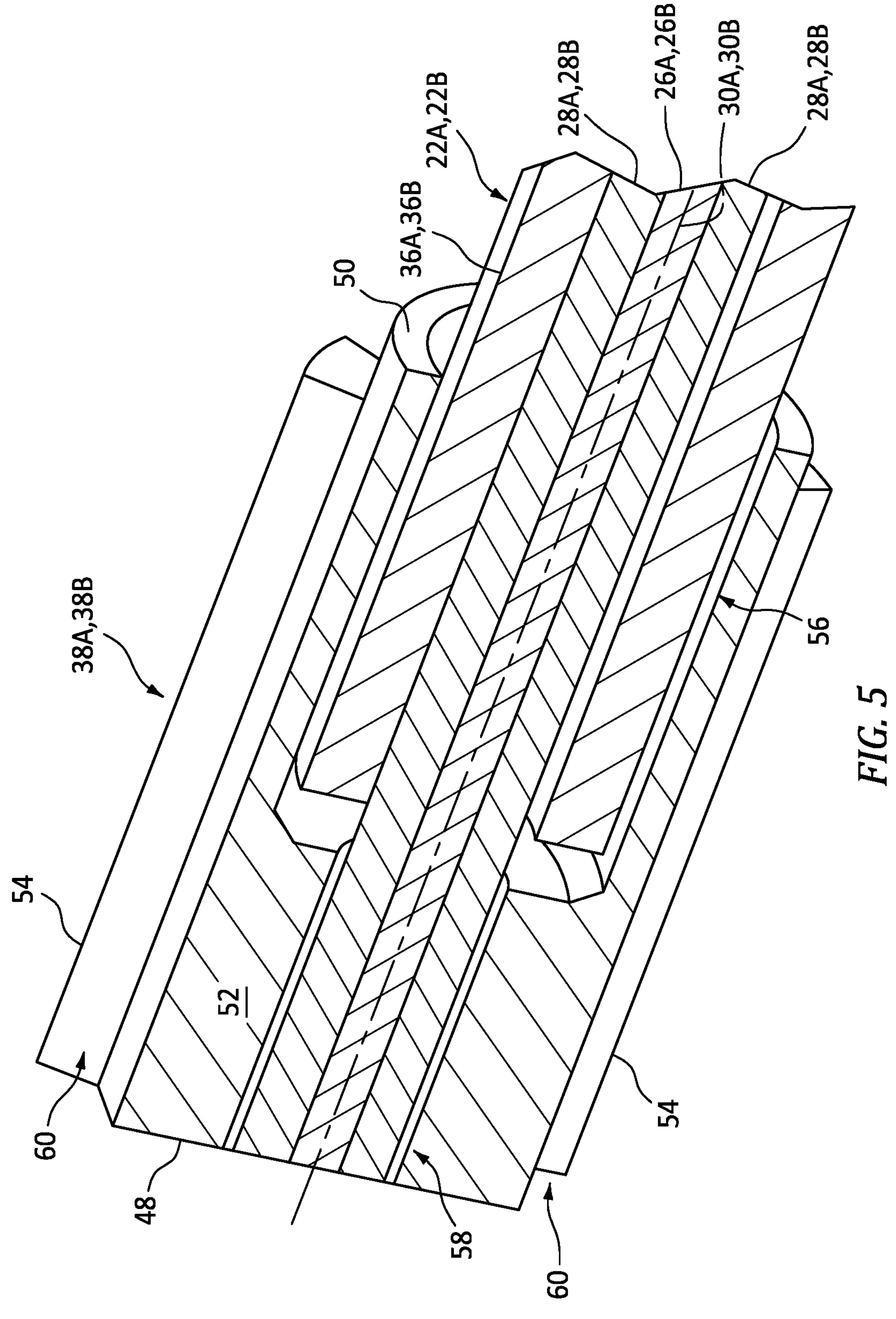
FIG. 5 is a partial perspective cutaway illustration of the optics line mated with an optical connector.

Referring to FIG. 5, each line connector 38 extends longitudinally between and to an end face 48 and a base end 50 of the respective line connector 38. Each line connector 38 includes a connector base 52 and one or more connector protrusions 54 (e.g., ribs).

The connector base 52 extends longitudinally from the connector base end 50 to the connection end face 48. The connector base 52 extends circumferentially about (e.g., completely around) the longitudinal centerline 30, which longitudinal centerline 30 may also be a longitudinal axis of the respective line connector 38. The connector base 52 of FIG. 5 includes a line receptacle 56 (e.g., a counterbore) and a fiber receptacle 58 (e.g., a bore). The line receptacle 56 projects longitudinally into the respective line connector 38 and its connector base 52 from the connector base end 50 to the fiber receptacle 58. The fiber receptacle 58 projects longitudinally into the respective line connector 38 and its connector base 52 from the connector end face 48 to the line receptacle 56. An annular shelf is formed at an intersection between the line receptacle 56 and the fiber receptacle 58. The shelf of FIG. 5 extends radially outward from an outer surface forming the fiber receptacle 58 to an outer surface forming the line receptacle 56.

Figure 6:
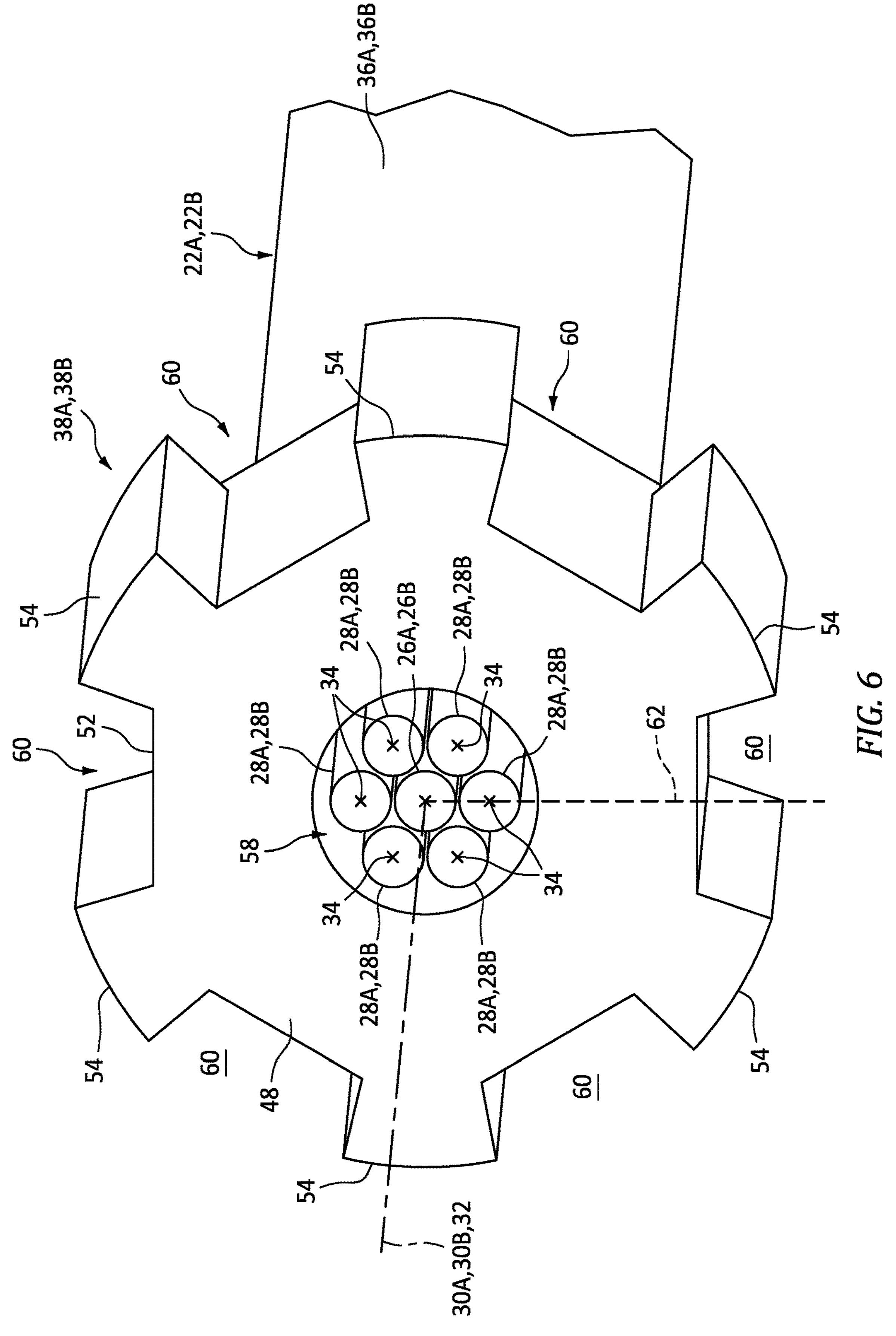
FIG. 6 is a partial perspective illustration of the optics line mated with the optical connector.

Each of the connector protrusions 54 is connected to (e.g., formed integral with) the connector base 52. Each connector protrusion 54 projects radially out from the connector base 52 to a radial outer distal side of the respective connector protrusion 54. Each connector protrusion 54 extends longitudinally along the connector base 52. Each connector protrusion 54 of FIG. 5, for example, extends longitudinally from the connector end face 48 to or about the connector base end 50. Referring to FIG. 6, the connector protrusions 54 are distributed circumferentially about the connector base 52 in a circular array. Within this array, each connector protrusion 54 is located circumferentially between and circumferentially spaced from a set of circumferential neighboring (e.g., adjacent) connector protrusions 54. With this arrangement, each circumferentially neighboring pair of the connector protrusions 54 forms a connector groove 60; e.g., a channel, a slot, etc. Each connector groove 60 extends circumferentially within the respective line connector 38 between the respective circumferentially neighboring pair of the connector protrusions 54. Each connector groove 60 projects radially into the respective line connector 38 to the connector base 52. Referring to FIG. 5, each connector groove 60 extends longitudinally through the respective line connector 38. The line connector 38 of FIG. 6 is thereby provided with an array of the connector grooves 60, which connector grooves 60 are circumferentially interspersed with the connector protrusions 54.

Referring to FIG. 5, each optics line 22 and its optical fibers 26 and 28 is mated with the respective line connector 38. An end portion of each optics line 22, for example, may be inserted into the respective line connector 38. In particular, the optical sheath 36 of FIG. 5 projects longitudinally into the line receptacle 56 and may be abutted longitudinally against or disposed near the annular shelf. The optical sheath 36 may also be bonded (e.g., brazed, glued, etc.) to the line connector 38 and its connector base 52. The optical fibers 26 and 28 of FIG. 5 project longitudinally out from the optical sheath 36 into the fiber receptacle 58. These optical fibers 26 and 28 may extend longitudinally through the fiber receptacle 58 to (or about) the connector end face 48. The optical fibers 26 and 28 may also be bonded (e.g., glued) to the line connector 38 and its connector base 52.

Referring to FIG. 6, the optics line 22 and its optical fibers 26 and 28 are arranged with the line connector 38 in a select matter; e.g., known, predetermined manner. Each peripheral optical fiber 28 of FIG. 6, for example, is circumferentially aligned with a respective one of the connector grooves 60. More particularly, each longitudinal centerline 34 is circumferentially aligned with (e.g., located on a common ray 62 out from the longitudinal centerline 30 as) a circumferential center of the respective connector groove 60. The present disclosure, however, is not limited to such an exemplary arrangement. For example, in other embodiments, each peripheral optical fiber 28 and its longitudinal centerline 34 may be circumferentially aligned with a respective one of the connector protrusions 54 and its circumferential center. While the specific arrangement of the optical fibers 26 and 28 may vary and the relative location of those optical fibers 26 and 28 relative to the line connector 38 may vary, these arrangements in general should be the same for each set of optical fibers 26A and 28A, 26B and 28B and the line connector 38A, 38B. In other words, the arrangement of the first optical fibers 26A and 28A and the first connector 38A in general should match (e.g., be the same as) and/or otherwise compliment (e.g., mirror, etc.) the arrangement of the second optical fibers 26B and 28B and the second connector 38B.

Figure 7:
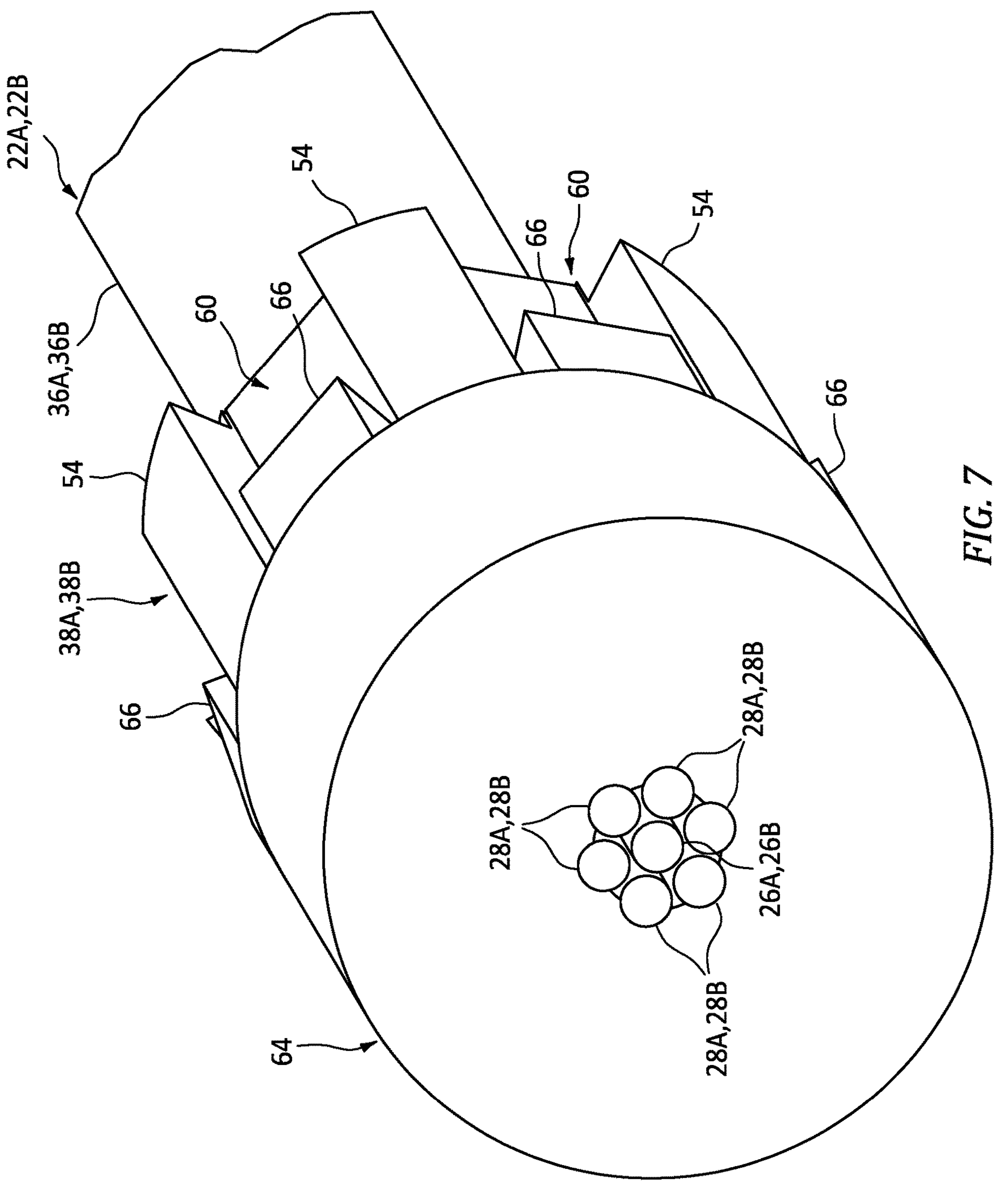
FIG. 7 is a perspective illustration of a guide used for mating the optics line with the optical connector.

Referring to FIG. 7, to aid in arranging the optical fibers 26 and 28 with the line connector 38 and within the fiber receptacle 58 (see FIGS. 5 and 6) in the select manner, the optical fibers 26 and 28 may be bonded to the line connector 38 using a (e.g., brass) fiber guide 64; e.g., a consumable fiber holder. This fiber guide 64 is configured to receive and hold the optical fibers 26 and 28 in a select arrangement. The fiber guide 64 is also configured to arrange the optical fibers 26 and 28 relative to the line connector 38 in the select manner. For example, the fiber guide 64 may include one or more arms 66 that project longitudinally into the respective connector grooves 60. Following the bonding between the optical fibers 26 and 28 and the line connector 38, the fiber guide 64 may be removed. The fiber guide 64, for example, may be ground off (e.g., polished away) until the connector end face 48 is exposed and/or defined. This removal process may also serve to provide the optical fibers 26 and 28 with polished (e.g., optically unobstructed) ends. The present disclosure, however, is not limited to such an exemplary process for arranging the optical fibers 26 and 28 with the respective line connector 38.

Figures 8, 9:
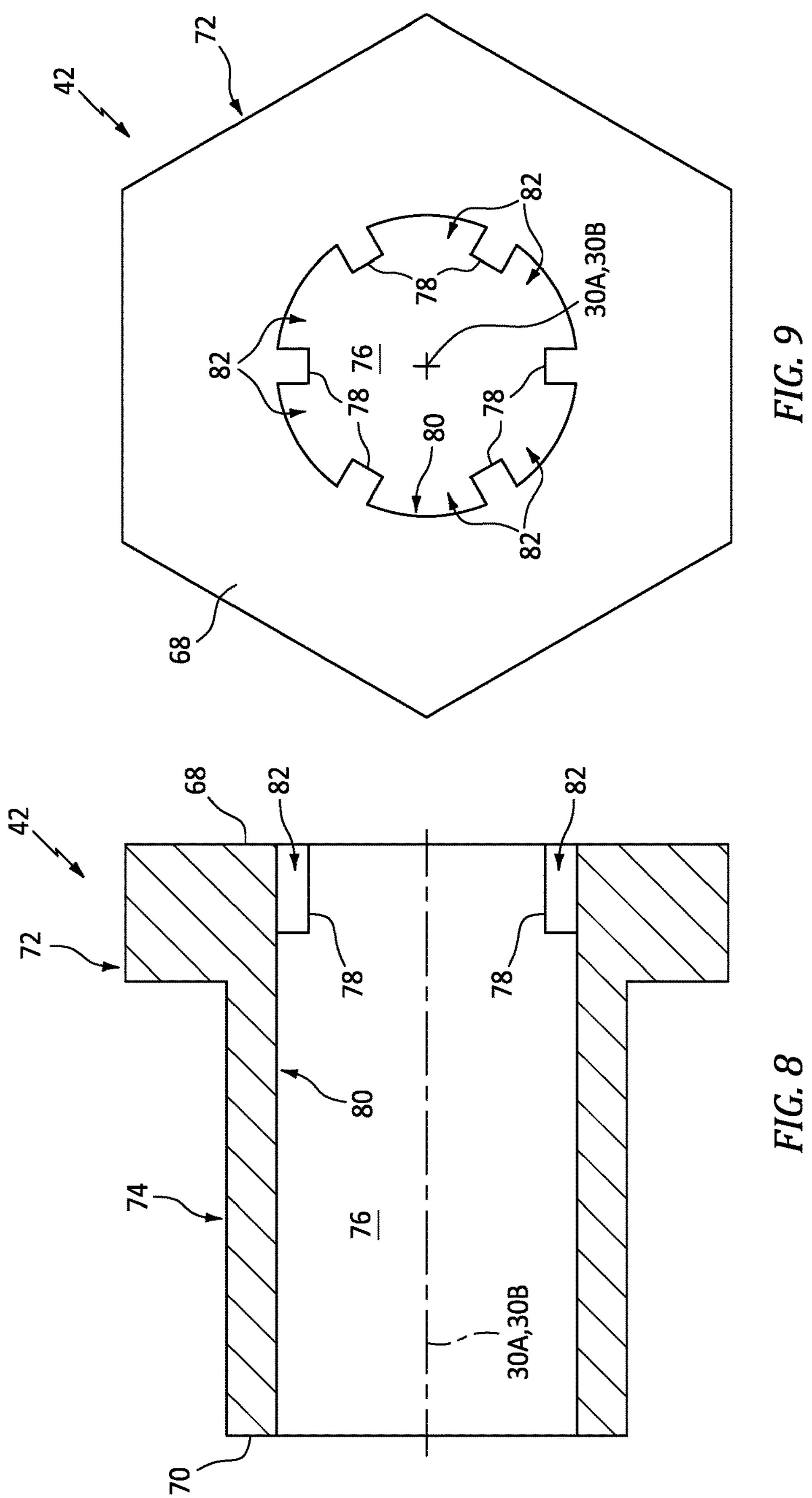
FIG. 8 is a sectional illustration of a coupler bolt.
FIG. 9 is an end view illustration of the coupler bolt.

Referring to FIG. 8, the coupler bolt 42 extends longitudinally along the longitudinal centerline 30 between and to a head end 68 of the coupler bolt 42 and a shaft end 70 of the coupler bolt 42, which longitudinal centerline 30 may be a longitudinal centerline of the coupler bolt 42. The coupler bolt 42 includes a bolt head 72 and a bolt shaft 74 connected to (e.g., formed integral with) the bolt head 72. The bolt head 72 is disposed at the head end 68. The bolt shaft 74 projects longitudinally out from the bolt head 72 along the longitudinal centerline 30 to the shaft end 70.

The coupler bolt 42 of FIG. 8 also includes an interior bore 76 and one or more bolt protrusions 78. The interior bore 76 extends longitudinally through the coupler bolt 42 and its bolt member 72 and 74 along the longitudinal centerline 30 from the head end 68 to the shaft end 70. The bolt protrusions 78 are arranged within the interior bore 76. More particularly, each of the bolt protrusions 78 is connected to (e.g., formed integral with) a base 80 of the coupler bolt 42, which bolt base 80 is formed by one or more of the bolt members 72 and 74. Each bolt protrusion 78 projects radially out from the bolt base 80 (in a radial inward direction towards the longitudinal centerline 30) to a radial inner distal side of the respective bolt protrusion 78. Each bolt protrusion 78 extends longitudinally along the bolt base 80. Each bolt protrusion 78 of FIG. 8, for example, extends longitudinally from or about the head end 68 to an opposing end longitudinally spaced from the shaft end 70. Each bolt protrusion 78 of FIG. 8, in particular, may extend longitudinally along a partial length of the bolt head 72. Referring to FIG. 9, the bolt protrusions 78 are distributed circumferentially about the longitudinal centerline 30 in a circular array. Within this array, each bolt protrusion 78 is located circumferentially between and circumferentially spaced from a set of circumferential neighboring (e.g., adjacent) bolt protrusions 78. With this arrangement, each circumferentially neighboring pair of the bolt protrusions 78 forms a bolt groove 82; e.g., a channel, a slot, etc. Each bolt groove 82 extends circumferentially within the bolt base 80 between the respective circumferentially neighboring pair of the bolt protrusions 78. Each bolt groove 82 projects radially into the bolt base 80 to an outer side of the bolt groove 82. Referring to FIG. 8, each bolt groove 82 extends longitudinally through the respective bolt base 80. The coupler bolt 42 of FIG. 9 is thereby provided with an array of the bolt grooves 82, which bolt grooves 82 are circumferentially interspersed with the bolt protrusions 78.

Referring to FIG. 2, the coupler nut 44 extends longitudinally along the longitudinal centerline 30 between and to a line end 84 of the coupler nut 44 and a bolt end 86 of the coupler nut 44, which longitudinal centerline 30 may be a longitudinal centerline of the coupler nut 44. The coupler nut 44 includes a bolt receptacle 88 (e.g., a tapped counterbore)

and a line receptacle 90 (e.g., a bore). The bolt receptacle 88 projects longitudinally into the coupler nut 44 from the bolt end 86 to an endwall 92 of the coupler nut 44 at the line end 84. The line receptacle 90 projects longitudinally into the coupler nut 44 and through its endwall 92 from the line end 84 to the bolt receptacle 88. An annular shelf is formed at an intersection between the bolt receptacle 88 and the line receptacle 90. The shelf of FIG. 2 extends radially outward from an outer surface forming the line receptacle 90 to an outer surface forming the bolt receptacle 88.

Figures 10A, 10B:
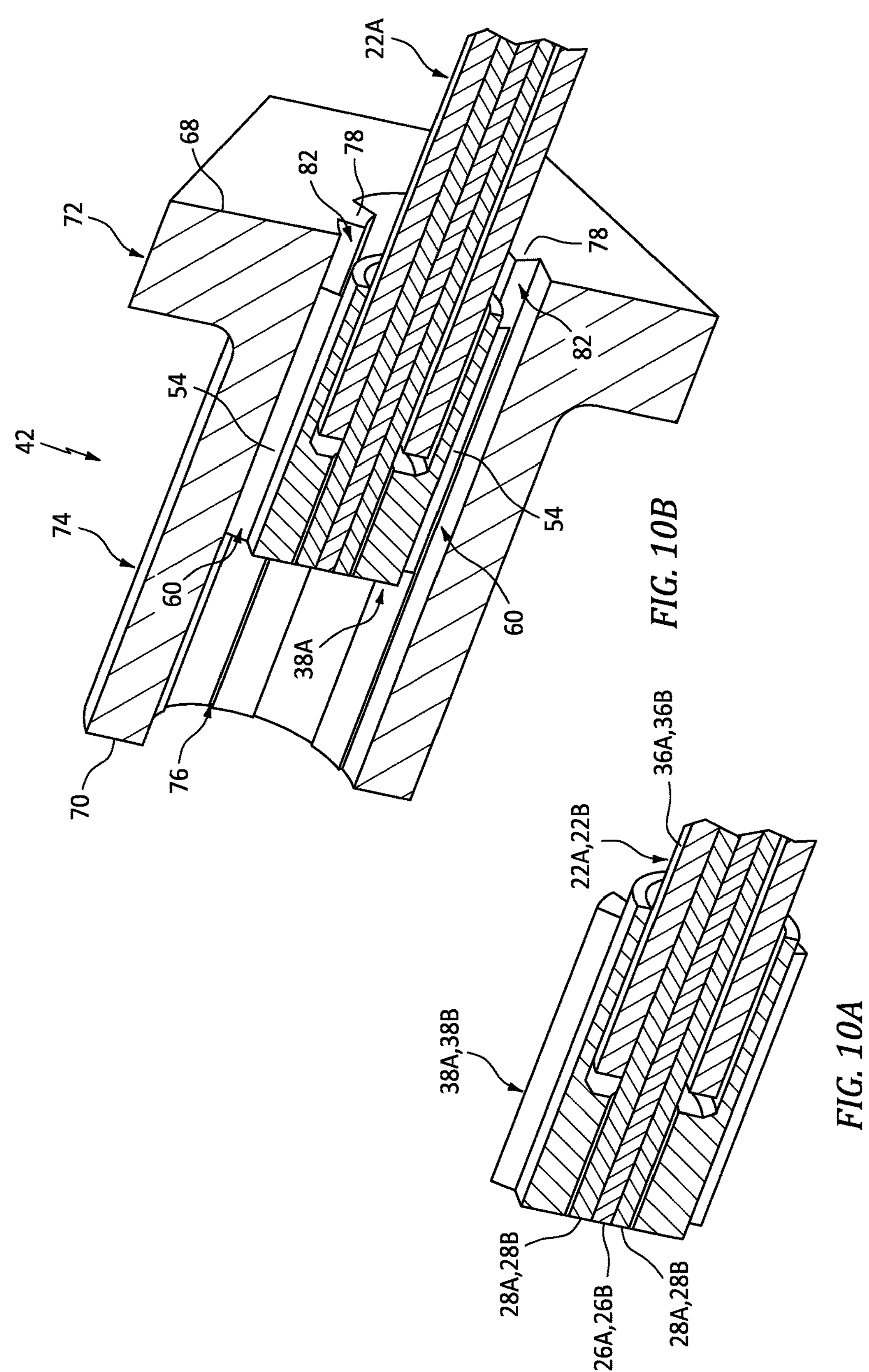
FIGS. 10A-F are partial perspective cutaway illustrations depicting an exemplary sequence for assembling the optical system.
Figures 10C, 10D:
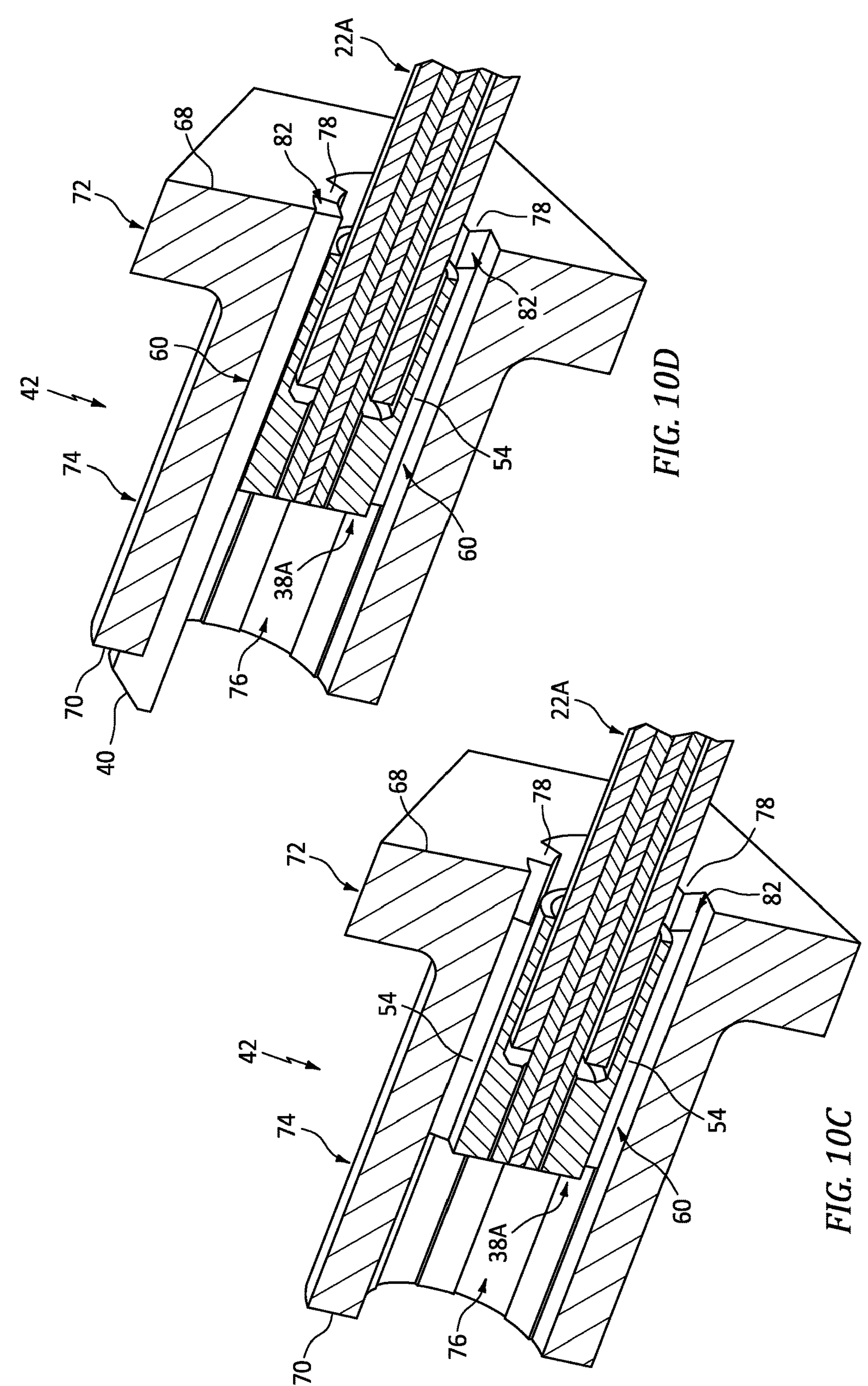
Figures 10E, 10F:
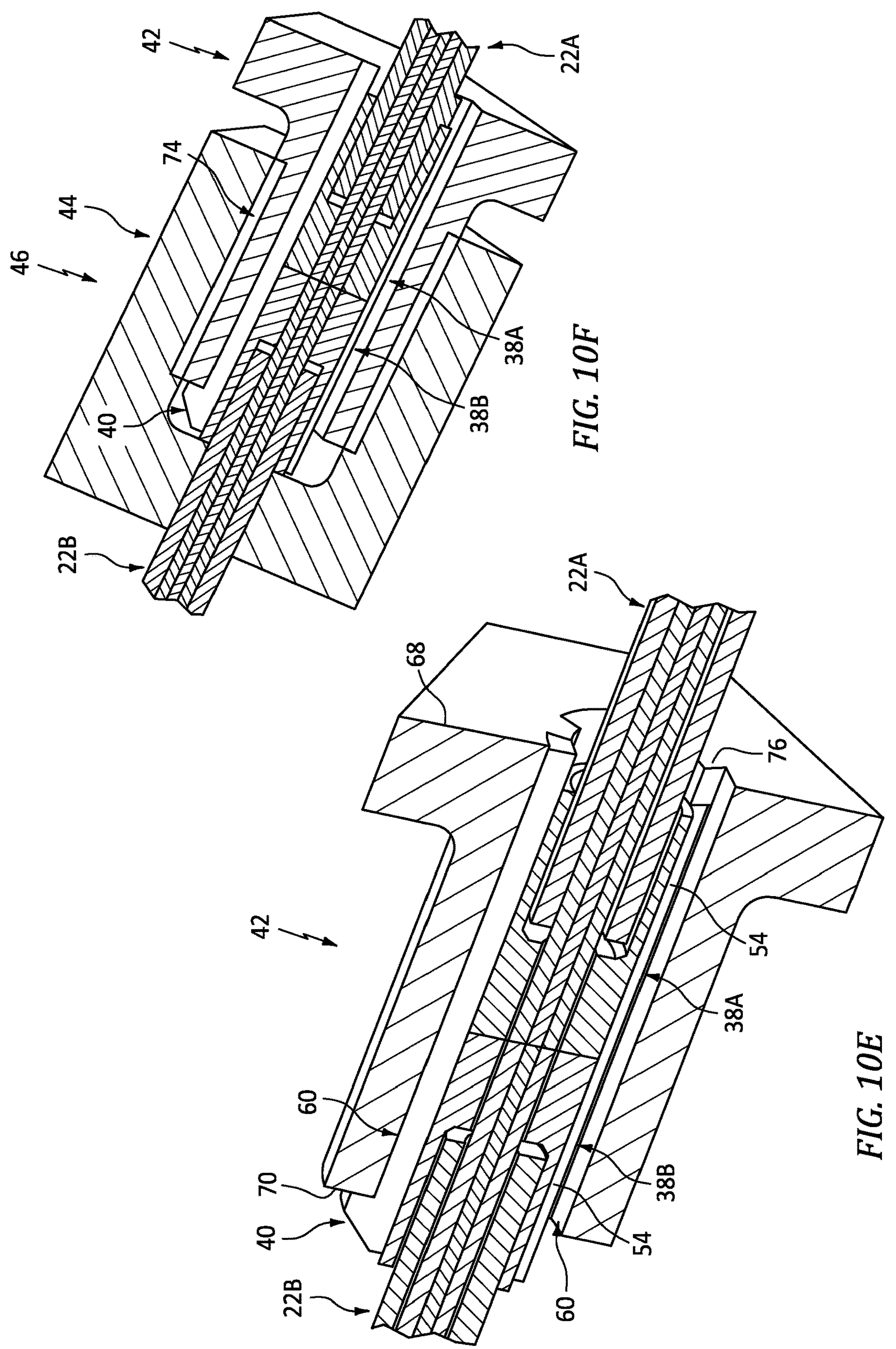

FIGS. 10A-F illustrate an exemplary sequence for assembling the optical system 20 of FIGS. 1 and 2. Referring to FIG. 10A, each optics line 22 and its optical fibers 26 and 28 are mated with and connected to the respective line connector 38. Referring to FIG. 10B, the first connector 38A is mated with the coupler bolt 42. The first connector 38A, for example, is inserted into the interior bore 76 from the head end 68. More particularly, each connector protrusion 54 is circumferentially aligned with and passed longitudinally through a respective one of the bolt grooves 82. Referring to FIG. 10C, the coupler bolt 42 is rotated about the first connector 38A and/or vice versa to (a) circumferentially align each connector groove 60 of the first connector 38A with a respective one of the bolt grooves 82 and (b) circumferentially align each connector protrusion 54 of the first connector 38A with a respective one of the bolt protrusions 78. Referring to FIG. 10D, the key 40 is mated with a respective one of the connector grooves 60 of the first connector 38A and a respective one of the bolt grooves 82. The key 40 of FIG. 10D, for example, is inserted into the interior bore 76 from the shaft end 70 and moved (e.g., translated, slid, passed, etc.) longitudinally through the respective connector groove 60 of the first connector 38A and into the respective bolt groove 82. The key 40 may thereby rotationally lock (e.g., fix) the first connector 38A to the coupler bolt 42. Referring to FIG. 10E, the second connector 38B is mated with the coupler bolt 42. The second connector 38B, for example, is inserted into the interior bore 76 from the shaft end 70. As the second connector 38B is mated with the coupler bolt 42, the key 40 is mated with (e.g., moves into) a respective one of the connector grooves 60 of the second connector 38B. The key 40 may thereby also rotationally lock (e.g., fix) the second connector 38B to the coupler bolt 42. Here, each connector protrusion 54 of the second connector 38B is circumferentially aligned with a respective one of the connector protrusions 54 of the first connector 38A. Referring to FIG. 10F, the coupler nut 44 is mated with the coupler bolt 42. The coupler nut 44 of FIG. 10F, for example, is threaded onto the bolt shaft 74 and torqued as specified, for example, in a design specification. With this arrangement, the key 40 is longitudinally captured within the housing structure 46.

Figure 12:
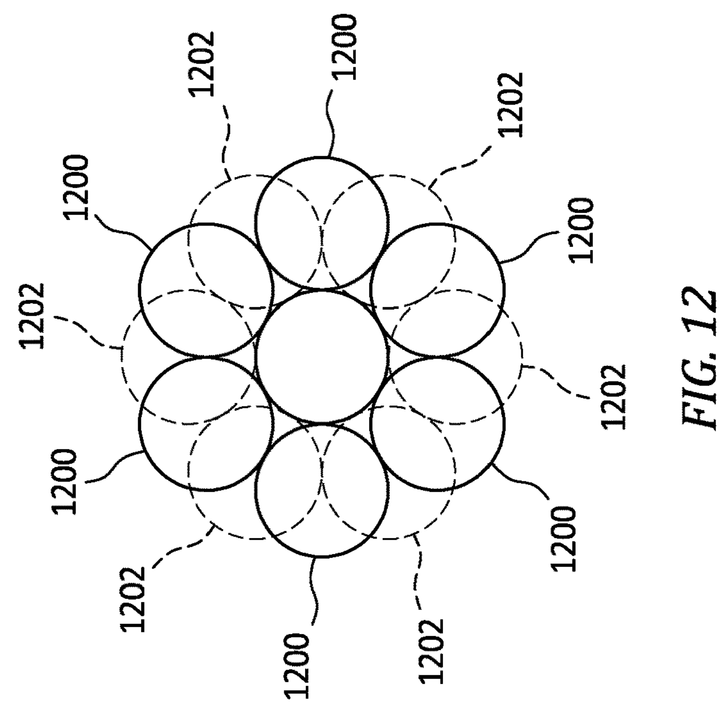
FIG. 12 is a schematic illustration depicting misalignment between optical fibers.
Figure 11:
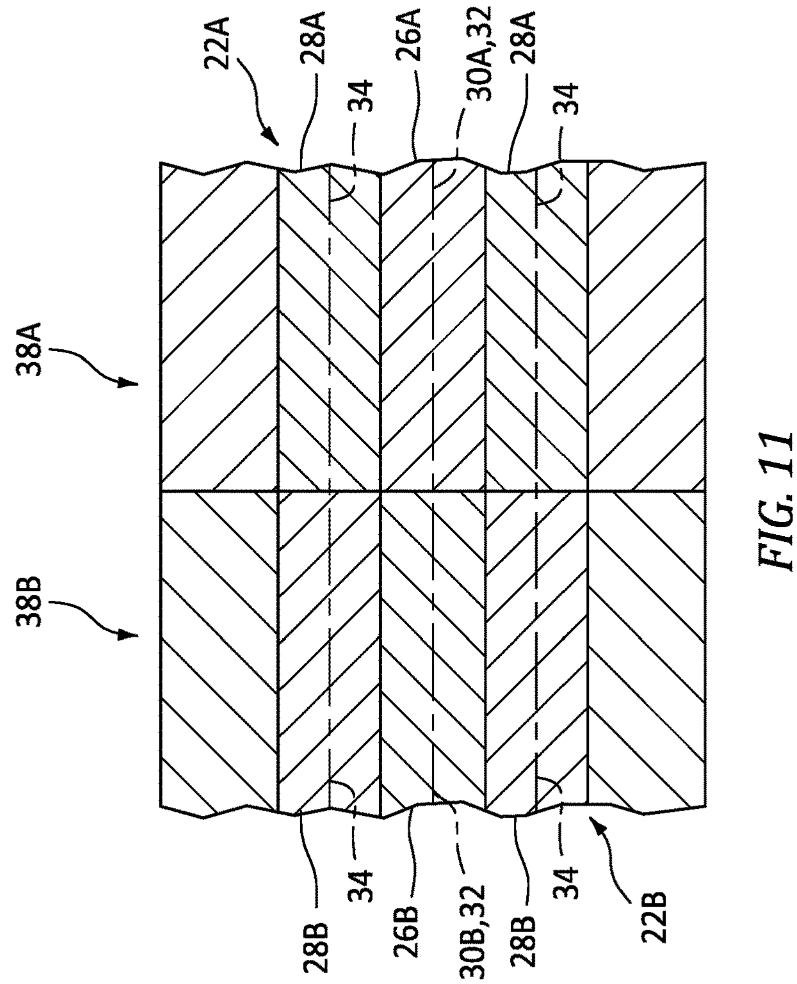
FIG. 11 is a sectional illustration at an interface between optical fibers.

When the optical system 20 of FIGS. 1 and 2 is assembled, referring to FIG. 11, each first optical fiber 26A, 28A of the first optics line 22A is aligned with a respective one of the second optical fibers 26B, 28B of the second optics line 22B. For example, each first optical fiber 26A, 28A and its longitudinal centerline 32, 34 may be substantially or completely coaxial with the respective second optical fiber 26B, 28B and its longitudinal centerline 32, 34. With such an arrangement, the end of each first optical fiber 26A, 28A laterally (e.g., radially and/or circumferentially) overlaps at least ninety percent (90%) or ninety-five percent (95%) of the end of the respective second optical fiber 26B, 28B. Where a set of the optical fibers 26A and 26B, 28A and 28B are completely aligned, the end of the first optical fiber 26A, 28A may completely (e.g., 100%) laterally overlap the end of the second optical fiber 26B, 28B, and vice versa. The alignment between the first optical fibers 26A and 28A and the second optical fibers 26B and 28B may promote enhance light transmission between the first optical fibers 26A and 28A and the second optical fibers 26B and 28B. For example, at least sixty, seventy or even eighty percent (60%, 70% or 80%) of light may be transmitted between a respective set of the optical fibers 26A and 26B, 28A and 28B. By contrast, referring to FIG. 12, where first optical fibers 1200 are (e.g., circumferentially) misaligned from second optical fibers 1202, less than forty or thirty percent (40-30%) of light may be transferred.

The optical system 20 of FIGS. 1 and 2 may be used for various applications. The optical system 20, for example, may be used for communicating information (e.g., light signals) between various devices; e.g., from a signal transmitter to a signal receiver, between transceivers, etc. The optical system 20 may also or alternatively be used for measuring one or more parameters. The optical system 20 of FIG. 13, for example, is configured for measuring one or more operational parameters of a rotor 94. This rotor 94 may be a bladed rotor 96 for a gas turbine engine 98. Examples of the bladed rotor 96 include, but are not limited to, a propulsor rotor (e.g., a fan rotor), a compressor rotor or any other ducted rotor within and/or rotatably driven by the gas turbine engine 98. The present disclosure, however, is not limited to measuring operational parameters for a bladed rotor, nor to measuring operational parameters for gas turbine engine applications. The optical system 20 (here, a measurement system), for example, may alternatively be configured to measure one or more operational parameters of any rotor in or coupled to various other types of rotational equipment such as, but not limited to, a reciprocating piston engine, a rotary engine, an electric motor and the like. However, for ease of description, the optical system 20 is described below with reference to the bladed rotor 96.

The operation parameters may include a blade time of arrival (BTOA) for one or more rotor blades 100 of the bladed rotor 96. The blade time of arrival may be indicative of a point in time when a tip 102 (or another portion) of one of the rotor blades 100 arrives at or crosses (e.g., passes) a measurement location; e.g., a probe location. The present disclosure, however, is not limited to such exemplary operational parameters. The operational parameters, for example, may also or alternatively include a blade tip clearance (BTC). The blade tip clearance may be indicative of a (e.g., minimum or average) radial distance between the tip 102 of one of the rotor blades 100 and a duct wall 106 circumscribing and housing the bladed rotor 96.

Figure 14:
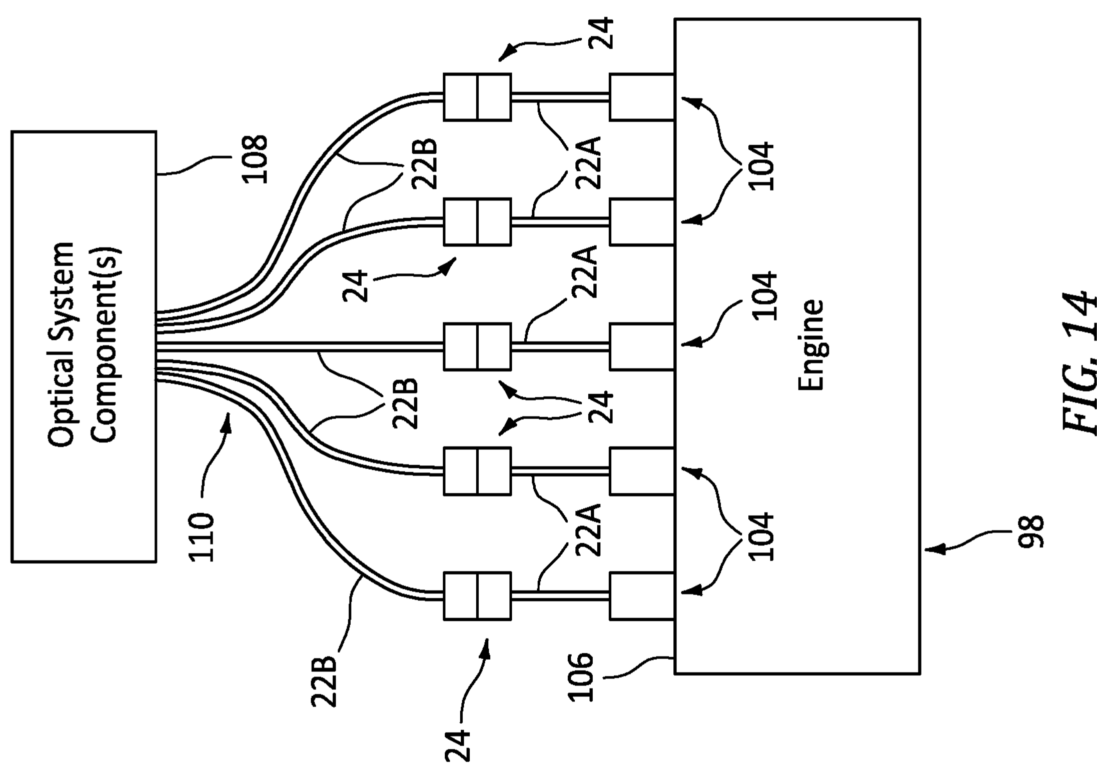
FIG. 14 is a schematic illustration of the measurement system configured with multiple of the optical probes.
Figure 13:
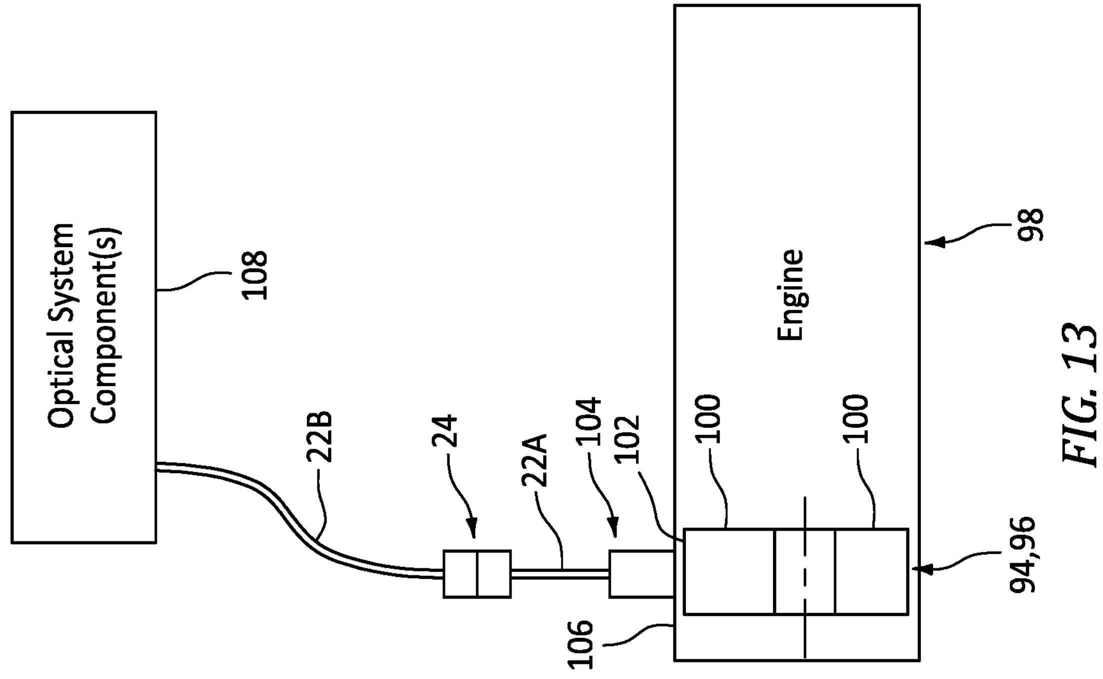
FIG. 13 is a schematic illustration of the optical system configured as a measurement system with an optical probe monitoring an engine.

The optical system 20 of FIG. 13 includes an optical probe 104 that is mounted to the wall 106; e.g., a duct wall housing the bladed rotor 96. This optical probe 104 includes the first optics line 22A (or alternatively the second optics line 22B). The optical system 20 of FIG. 13 also includes one or more other optical system components 108. These optical system components 108 are in signal communication with the optical probe 104 through the second optics line 22B (or alternatively the first optics line 22A). Examples of the optical system components 108 include, but are not limited to, a light emission device such as an LED or a laser, a light sensing device such as a light receptor, a processor, etc. Utilizing the optics lines 22 and the optical coupler 24 to optically couple the optical probe 104 to the optical system component(s) 108 may facilitate arranging the optical probe 104 in difficult to reach locations. For example, the optical probe 104 may first be routed, as needed, to mount with the wall 106. Then, the optical coupler 24 may be assembled to connect the optical probe 104 to the other optical system component(s) 108. This may also be useful where the gas turbine engine 98 is configured with multiple optical probes 104 as shown, for example, in FIG. 14. Here, the optical probes 104 may similarly be arranged with the gas turbine engine 98 and then plugged into a harness 110 for the optical system components 108.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An optical system, comprising:

a first optics line including a plurality of first optical fibers;

a second optics line including a plurality of second optical fibers; and an optical coupler removably connecting the first optics line to the second optics line, the optical coupler aligning an end of each of the plurality of first optical fibers with an end of a respective one of the plurality of second optical fibers to optically couple each of the plurality of first optical fibers to the respective one of the plurality of second optical fibers;

the optical coupler including a key configured to clock the first optics line and the second optics line about a longitudinal centerline such that the end of each of the plurality of first optical fibers is aligned with the end of the respective one of the plurality of second optical fibers.

2. The optical system of claim 1, wherein each of the plurality of first optical fibers is coaxial with the respective one of the plurality of second optical fibers.

3. The optical system of claim 1, wherein the end of each of the plurality of first optical fibers laterally overlaps at least ninety percent of the end of the respective one of the plurality of second optical fibers.

4. The optical system of claim 1, wherein the plurality of first optical fibers includes a central first optical fiber; and a plurality of peripheral first optical fibers arranged circumferentially about the central first optical fiber.

5. The optical system of claim 1, wherein the optical coupler includes a bolt and a nut threaded onto the bolt;

the first optics line projects into the bolt; and the second optics line projects into the nut.

6. The optical system of claim 5, wherein the plurality of first optical fibers are optically coupled to the plurality of second optical fibers at an interface within the bolt.

7. The optical system of claim 1, wherein the optical coupler includes a first connector and a second connector abutted longitudinally against the first connector;

the plurality of first optical fibers project longitudinally through a bore of the first connector to an end face of the first connector, and the plurality of first optical fibers are bonded to the first connector; and the plurality of second optical fibers project longitudinally through a bore of the second connector to an end face of the second connector, and the plurality of second optical fibers are bonded to the second connector.

8. The optical system of claim 7, wherein the first optics line further includes a first optical sheath connected to the first connector, and the plurality of first optical fibers project out from the first optical sheath into the bore of the first connector; and the second optics line further includes a second optical sheath connected to the second connector, and the plurality of second optical fibers project out from the second optical sheath into the bore of the second connector.

9. The optical system of claim 1, further comprising an optical probe comprising one of the first optics line or the second optics line.

10. The optical system of claim 1, further comprising a light source optically coupled to one of the first optics line or the second optics line.

11. The optical system of claim 1, further comprising a light sensor optically coupled to one of the first optics line or the second optics line.

12. An optical system, comprising:

a first optics line including a plurality of first optical fibers;

a second optics line including a plurality of second optical fibers; and an optical coupler removably connecting the first optics line to the second optics line, the optical coupler aligning an end of each of the plurality of first optical fibers with an end of a respective one of the plurality of second optical fibers to optically couple each of the plurality of first optical fibers to the respective one of the plurality of second optical fibers;

the optical coupler including a first connector and a second connector abutted longitudinally against the first connector;

the plurality of first optical fibers projecting longitudinally through a bore of the first connector to an end face of the first connector, and the plurality of first optical fibers bonded to the first connector;

the plurality of second optical fibers projecting longitudinally through a bore of the second connector to an end face of the second connector, and the plurality of second optical fibers bonded to the second connector; and the first connector and the second connector are rotationally fixed within the optical coupler.

13. The optical system of claim 12, wherein the first connector and the second connector are indexed to facilitate the aligning of the end of each of the plurality of first optical fibers with the end of the respective one of the plurality of second optical fibers.

14. An optical system, comprising:

a first optics line including a plurality of first optical fibers;

a second optics line including a plurality of second optical fibers; and an optical coupler removably connecting the first optics line to the second optics line, the optical coupler aligning an end of each of the plurality of first optical fibers with an end of a respective one of the plurality of second optical fibers to optically couple each of the plurality of first optical fibers to the respective one of the plurality of second optical fibers;

the optical coupler including a first connector and a second connector abutted longitudinally against the first connector;

the plurality of first optical fibers projecting longitudinally through a bore of the first connector to an end face of the first connector, and the plurality of first optical fibers bonded to the first connector;

the plurality of second optical fibers projecting longitudinally through a bore of the second connector to an end face of the second connector, and the plurality of second optical fibers bonded to the second connector; and the first connector including a first connector groove;

the second connector including a second connector groove; and the optical coupler further including a key arranged in the first connector groove and the second connector groove.

15. The optical system of claim 14, wherein the optical coupler further includes a bolt and a nut threaded onto the bolt;

the first optics line projects into the bolt;

the second optics line projects through an endwall of the nut and into the bolt; and the bolt includes a bolt groove, and the key is further arranged in the bolt groove.

* * * * *